United States Patent
Cornwell

(10) Patent No.: US 8,430,411 B2
(45) Date of Patent: Apr. 30, 2013

(54) MOBILIZED BEACH TROLLEY

(76) Inventor: John L. Cornwell, Port St. Lucie, FL (US)

( * ) Notice: Subject to any disclaimer, the term of this patent is extended or adjusted under 35 U.S.C. 154(b) by 342 days.

(21) Appl. No.: 11/985,605

(22) Filed: Nov. 17, 2007

(65) Prior Publication Data
US 2009/0127807 A1     May 21, 2009

(51) Int. Cl.
*B62D 57/00* (2006.01)
(52) U.S. Cl.
USPC .......... 280/28.5; 280/32; 280/32.6; 305/120; 305/121; 305/122
(58) Field of Classification Search ............... 180/9.1, 180/9.21, 9.22, 5.22; 280/28.5
See application file for complete search history.

(56) References Cited

U.S. PATENT DOCUMENTS

| | | | | |
|---|---|---|---|---|
| 4,401,178 A | * | 8/1983 | Studer | 180/8.2 |
| 5,222,748 A | * | 6/1993 | Johnson | 280/8 |
| 5,305,846 A | * | 4/1994 | Martin | 180/181 |
| 5,380,022 A | * | 1/1995 | Dennis | 280/47.35 |
| 6,446,742 B1 | * | 9/2002 | Wilson | 180/65.6 |
| 6,877,764 B2 | * | 4/2005 | Sagol | 280/655.1 |
| 6,962,221 B1 | * | 11/2005 | Carrette | 180/9.1 |

\* cited by examiner

*Primary Examiner* — Tony H. Winner
*Assistant Examiner* — Jacob Knutson
(74) *Attorney, Agent, or Firm* — Carter, DeLuca, Farrell & Schmidt, LPP

(57) ABSTRACT

A selectively configurable trolley for transporting articles across a given terrain includes a housing having a top platform and sides that at least partially define an enclosure for mounting internal operating components therein. One or more roller bearings are disposed within the housing and all configured to rotatingly support a drive belt. A handle is attached to the housing for pushing or pulling the trolley and a guide roller is disposed at a proximal end of the housing and is angled relative to the roller bearings to facilitate rotation of the belt therearound.

16 Claims, 20 Drawing Sheets

MOBILIZED BEACH TROLLEY

BACKGROUND

1. Technical Field

The present disclosure relates to carts and, more particularly, to a trolley-like beach cart which facilitates transport and storage of beach-related items.

2. Background of Related Art

Historically, beach carts and storage containers were used to transport and/or convey miscellaneous beach-related items from a person's house or car to a remote beach location usually in relative proximity to the water. For example, a beach cooler could be utilized to transport and kept perishable items cool or "fresh" for later consumption. Typically, these types of beach carts and storage containers (e.g., coolers, beach bags, etc.) were in the past carried and/or transported via the use of a handle(s) and/or shoulder strap(s). Eventually, wheels were incorporated into the design thereby facilitating transport of the container along a particular surface (hard floor) but still requiring the user to either push, pull and/or manipulate the container during transport. However, movement of these known wheel-like containers along different and/or varying surfaces, e.g., sand, mud or grass, would require varying levels of added exertion.

For example it is known that even the best wheel-like design required some degree of user manipulation during transport, e.g., to navigate or steer the container across a given terrain. Again, the type of terrain, e.g., sand versus hard floor, greatly affects the degree of difficulty with this task. As a result, the user is forced to heed considerable attention to the storage container during transport which may affect other equally important activities which are commonplace with a typical trip to the beach, e.g., minding small children, caring for an elderly person and/or manipulating other items such as umbrellas. Moreover, these concerns are exaggerated and remain particularly disadvantageous to the physically challenged. In addition, carrying or wheeling a container through certain environments can be quite grueling even for a physically-fit user. For example, a cooler must typically be carried or dragged across the sand or grass to a spot of relaxation because the wheels (if any) function poorly in the sand or on the grass.

So far as is known, if a user wishes to negotiate a container such across a terrain and the wheels (if any) are not particularly suited for this type of terrain, the user is left with two (2) options: 1) drag and possible ruin the wheels and/or the container itself, or 2) carry the container across the terrain. As can be appreciated, both exercises require a large amount of exertion on the part of the user.

Thus, there exists a need for a new, simple, yet effective, container design which reduces the burdens and issues associated with transporting and handling the containers across any given terrain.

SUMMARY

A selectively configurable trolley for transporting articles across a given terrain includes a housing having a top platform and sides that at least partially define an enclosure for mounting internal operating components therein. One or more roller bearings is disposed within the housing and configured to rotatingly support a drive belt. A handle is attached to the housing for pushing or pulling the trolley and a guide roller is disposed at a proximal end of the housing and is angled relative to the roller bearings to facilitate rotation of the belt therearound. In one embodiment, the most proximal roller bearing is raised relative to the other roller bearings to facilitate rotation of the belt.

The top platform may be grated and include a series of support sleeves defined therein. One or more of the support sleeves may be configured to engage an angled coupling which operatively engages the handle.

In one embodiment, the handle is telescopic and/or recessable within the top platform for storage, e.g., foldable, storable, etc. The support sleeves may be configured to operatively engage the handle, one or more support poles, an umbrella or a support stanchion.

In another embodiment, the belt includes a series of longitudinal ridges disposed thereon which reduce yaw. The belt may be configured to include a material made from a first coefficient of friction disposed on a first side thereof and a material made from a second coefficient of friction disposed on a second side thereof.

The present disclosure also relates to a selectively configurable trolley for transporting articles across a given terrain including a housing including a top platform and sides that at least partially define an enclosure for mounting internal operating components therein. The top platform includes a series of support sleeves defined therein. One or more roller bearings are disposed proximate a proximal portion of the housing and are configured to rotatingly support a belt at first and second ends. A handle is attached to the housing for pushing and/or pulling the trolley and one or more support poles is engageable within one or more corresponding support sleeves such that the support pole(s) extends upwardly therefrom. A retractable shade is engageable within a support sleeve defined in the housing. The shade includes a privacy screen which is selectively extendible to engage the support pole and form a partial enclosure atop the platform.

In one embodiment, three (3) support poles are positioned around the platform and the privacy screen wraps around the support poles to engage back upon the retractable shade to form a complete enclosure around the platform. The support poles may be telescopically extendible to an upright orientation.

In yet still another embodiment, one or more modular platforms are included having apertures defined therein which align with the support sleeves of the top platform. At least one of the apertures of the modular platforms and one support sleeve are configured to receive a support pole therethrough to secure the modular platform atop the top platform.

BRIEF DESCRIPTION OF THE DRAWINGS

Other objects and features of the present disclosure will become apparent from the following detailed description considered in connection with the accompanied drawings. It should be understood, however, that the drawings are designed for the purpose of illustration only and not as a definition of the limits of the present disclosure.

An illustrative embodiment of the subject mobilized beach trolley and method are described herein with reference to the drawings wherein:

FIGS. 12A-12D are a series of perspective views of a mobilized beach trolley of FIG. 1 with telescopic sleeves that assemble to form a retractable privacy screen;

FIGS. 14A-14C are a series of perspective views of a mobilized beach trolley of FIG. 1 with support stanchions that form a privacy shade.

DETAILED DESCRIPTION

Figure 1:
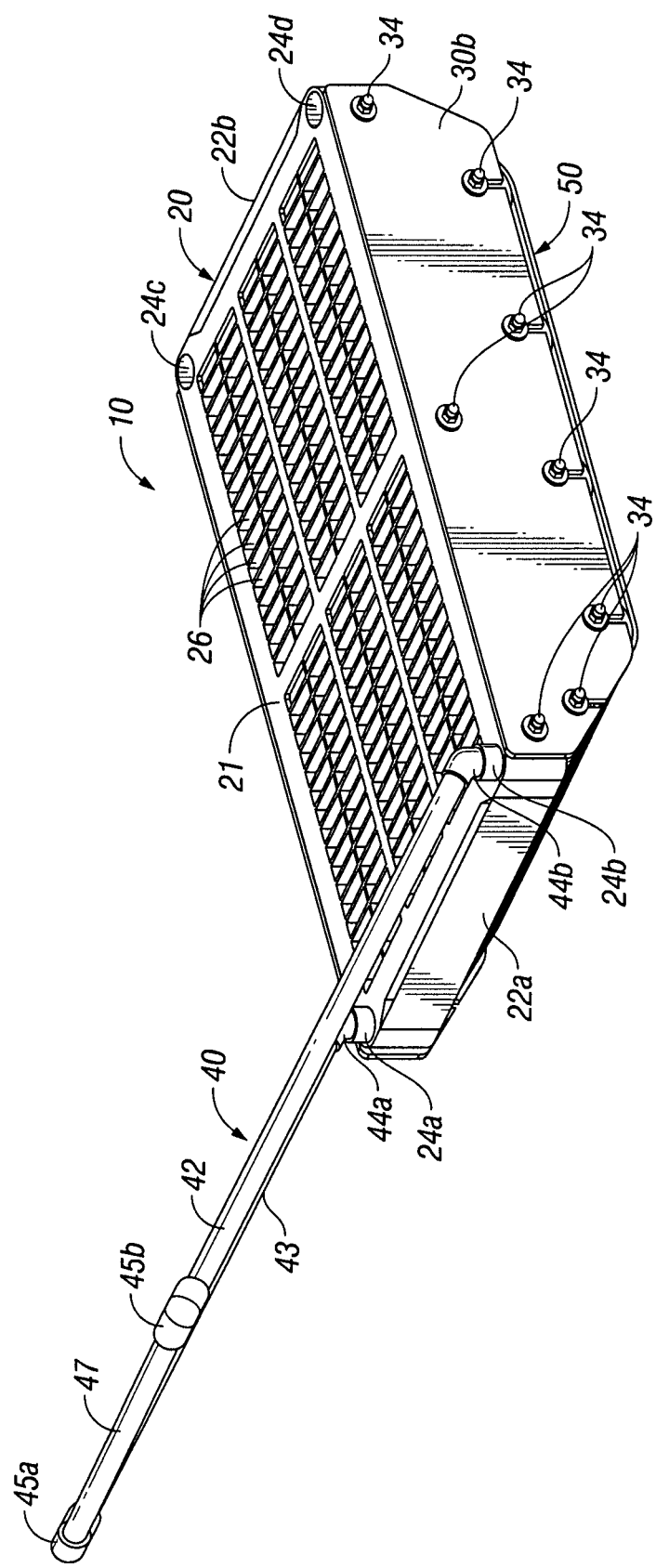
FIG. 1 is a perspective view of a mobilized beach trolley constructed in accordance with one embodiment of the present disclosure.
Figure 2:
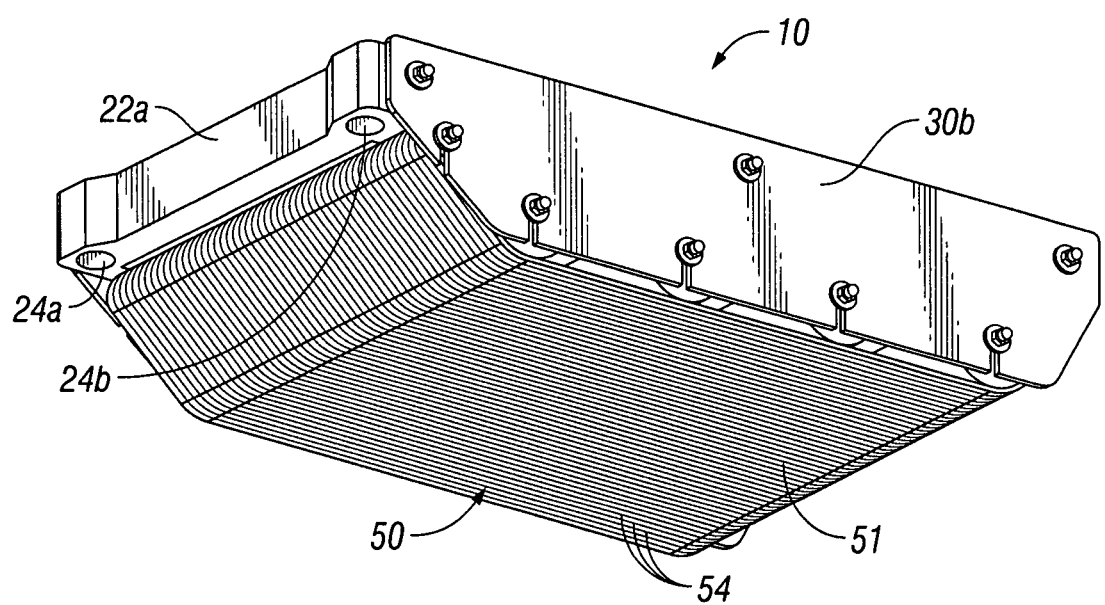
FIG. 2 is a bottom perspective view of the beach trolley of FIG. 1.

Referring now in detail to the drawing figures in which like reference numerals identify similar or identical elements, one embodiment of the present disclosure is illustrated generally in FIG. 1 and is designated therein a mobilized beach trolley 10. Although the various figure drawings show trolley 10 in one particular configuration, i.e., a trolley configuration, for the purposes herein the term "trolley" is defined to include, but should not necessarily be limited to, the following commercially named products: warmers, coolers, food containers and/or trunks.

As shown in the accompanying drawings, trolley 10 generally includes a housing assembly 20, a handle assembly 40 and a belt assembly 50 which together operate to facilitate transporting various items across a given terrain, e.g., a beach, grass, gravel, etc. Preferably, the trolley 10 is made from a durable material which is easy and cost effective to manufacture and mold into the required components, e.g., high strength plastics, fiberglass, etc.

As best shown in FIGS. 1-4, housing 20 includes a top platform 21 having a pair of opposing sidewalls 30a and 30b, respectively, which depend therefrom and which, together with a front wall 22a and a rear wall 22b define an enclosure 25 for housing the internal operating components of the trolley 10, e.g., belt assembly 50. It is contemplated that trolley 10 may be dimensioned in any cylindrical or polygonal configuration defining an enclosure 25 therein for housing the belt assembly (and any other internally disposed components as explained in more detail below).

As mentioned above, trolley 10 includes top platform 21 which is dimensioned to support the various items necessary for transport. Top platform 21 also includes a series of hollow support sleeve or support holes 24a, 24b, 24c and 24d defined in at least one of the four corners of the platform 21. Support sleeves 24a-24d may be any dimension and size to accommodate one or more of the many uses and purposes as contemplated by this disclosure. For example, two support sleeves 24a and 24b may be dimensioned to slideably and selectively receive a respective leg 43 and 42 of the handle assembly 40. More particularly and as best seen in FIG. 1, one leg 43 of handle 40 engages support sleeve 24a via an angled coupling 44a and the other leg 42 of handle 40 engages support sleeve 24b via an angled coupling 44b. It is envisioned that the particular angle of coupling 44a and 44b may be varied by a screw or pivot or interchangeable with a different pair of angled cuffs (not shown) having a smaller or greater angle depending on the relative height of the intended user. Other envisioned uses of the support sleeves 24a-24d are explained below with respect to the other figures.

Top platform 21 is preferably configured to include a grated surface or gates 26 which is particularly suitable for a beach-like environment and additionally reduces the overall weight of the trolley 10 considerably. As a result thereof, sand, dirt and other contaminates do not build up on the surface of the platform 21 and it is easy to clean. The surface of platform 21 may also be configured to include a high friction material (not shown) to reduce slippage of the various items contained thereon (See FIG. 3). Top platform 21 may also be interchanged with a different platform (not shown) depending upon a particular purpose. In this instance, the platform 21 may be dimensioned to selectively and removably engage the housing 20 to facilitate substitution.

Handle assembly 40 includes a handle bar 47 having a pair of angled couplings 45a and 45b which engage the opposite ends thereof and which correspondingly couple to legs 43 and 42 for engagement with the trolley platform 21 as described above. Couplings 45a and 45b maybe dimensioned at any angle to facilitate transport. For example, couplings 45a and 45b could be angled greater than 90° for a smaller handle bar 47 and less than 90° for a larger handle bar 47. Alternatively, the couplings could be angled less than 90° and be dimensioned such that the two legs engage a corresponding coupling e.g., 44a, disposed in a single support sleeve 24e (FIG. 5) disposed in the middle of the platform 21. The single coupling 44a may be dimensioned to swivel within the support sleeve 24e to facilitate handling and maneuvering the trolley 10.

Figure 4:
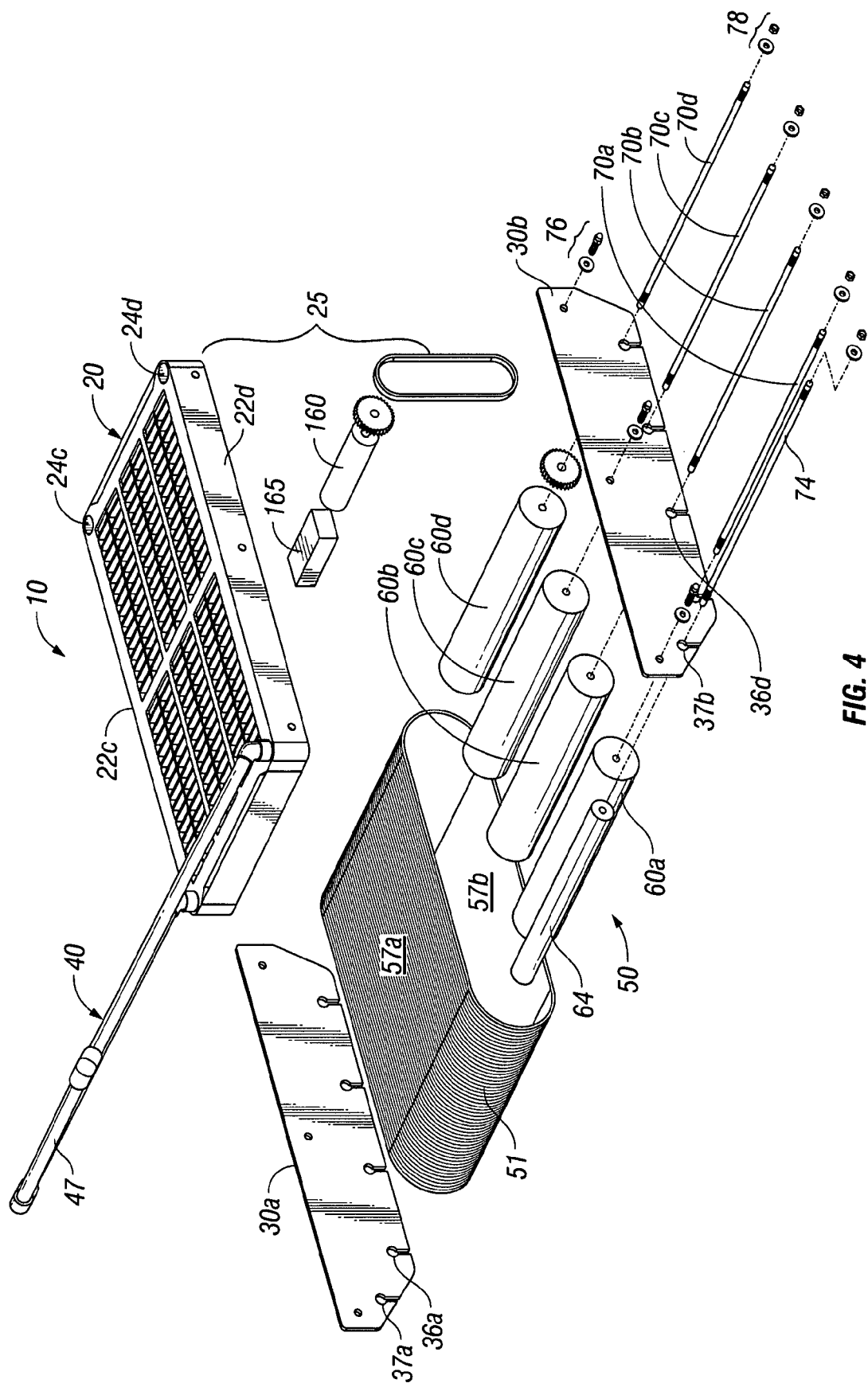
FIG. 4 is an exploded, perspective view of the beach trolley of FIG. 1.

FIG. 4 shows an exploded view of the trolley 10 which illustrates the internal operating components of the belt assembly 50. More particularly, belt assembly 50 includes a belt 51, a plurality of rollers 60a-60d with a corresponding plurality of axles 70a-70d and a guide roller 64 and guide axle 74. Each axle 70a-70d and 74 includes a corresponding mounting element which may include nuts, washers, grommets, etc. which mount the roller bearings 60a-60d, 64 and axles 70a-70d, 74 to the housing 20. The axles 70a-70d and 74 mount and support their respective corresponding roller bearings, namely, 60a-60d and 64 between sides 30a and 30b of the housing 20. Each axle 70a-70d and 74 is then secured on opposite sides thereof to the sides 30a and 30b of housing 20. Guide bar or guide bearing 64 is typically smaller than the other roller bearings 60a-60d and mounted at an angle relative to bearing 60a to facilitate rotation of the belt 51 and facilitate transport across a give terrain.

Figure 3:
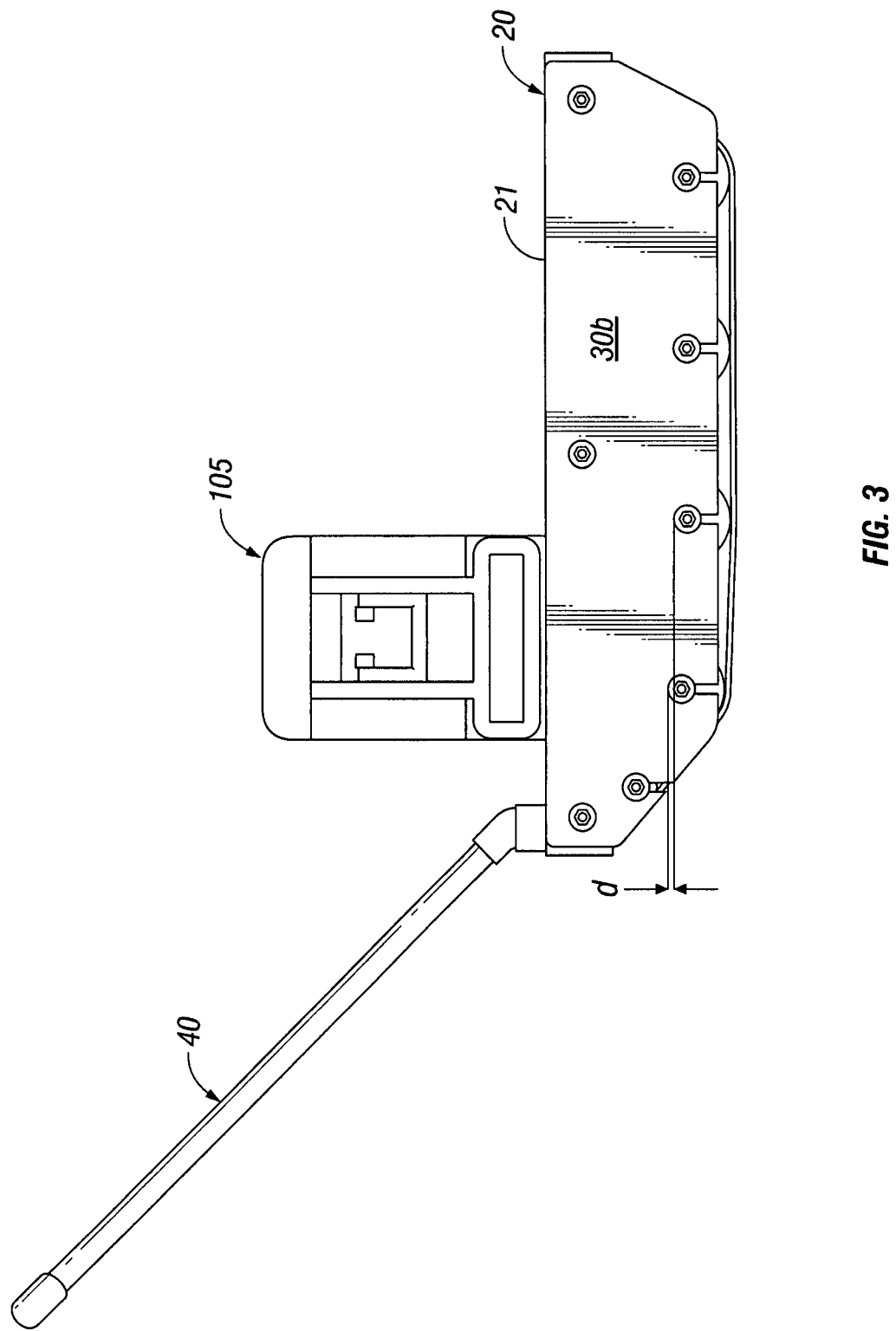
FIG. 3 is a side elevational view of the beach trolley of FIG. 1 showing a cooler disposed on a top thereof.

As best shown in FIG. 3, roller bearing 60a may be raised a distance "d" relative to the other roller bearings 60b-60d to facilitate handling and movement across a given terrain. Preferably, the roller bearing 60a is raised about ¼ inch relative to the other roller bearings 60b-60d to accomplish this purpose. It is also envisioned that roller bearing 60a may be selectively adjusted depending upon a particular purpose.

The belt 51 is assembled for rotation atop and around the roller bearings 60a-60d and guide bar 64. In one embodiment, the belt 51 includes an inner periphery 57b made from a high friction material to frictionally couple to the outer peripheries of each corresponding roller bearing 60a-60d and 64. This is envisioned to reduce slippage of the belt 51 atop the roller bearings 60a-60d and 64. The outer periphery 57a of the belt 51 may be configured to include a lower friction material to facilitate transport over certain types of terrain. Each roller bearing 60a-60d and 64 may also include a lubricant (not shown) to facilitate rotation atop a corresponding axle 70a-70d and 74. The belt may also include a plurality of raised longitudinal ridges 54 which run from a proximal to distal end thereof (See FIG. 2). It is envisioned that the ridges 54 are included to enhance movement of the trolley 10 across certain types of terrain and reduce the possibility of the trolley 10 yawing.

During use, the user simply loads various items e.g., cooler 105, atop platform 21 of the trolley 10 (See FIG. 3) and grips the handle bar 47. The trolley 10 may be pushed or pulled depending upon a particular purpose. Upon movement thereof, the trolley 10 glides across a given terrain due to the unique interaction of the roller bearings 60a-60d and 64 providing less frictional than dragging the trolley across the same surface. Moreover, the weight of the items, e.g., cooler 105, is evenly distributed across the platform 21 and equal load is applied to each bearing 60a-60d and 64 thus facilitating movement across a given terrain.

Figure 5:
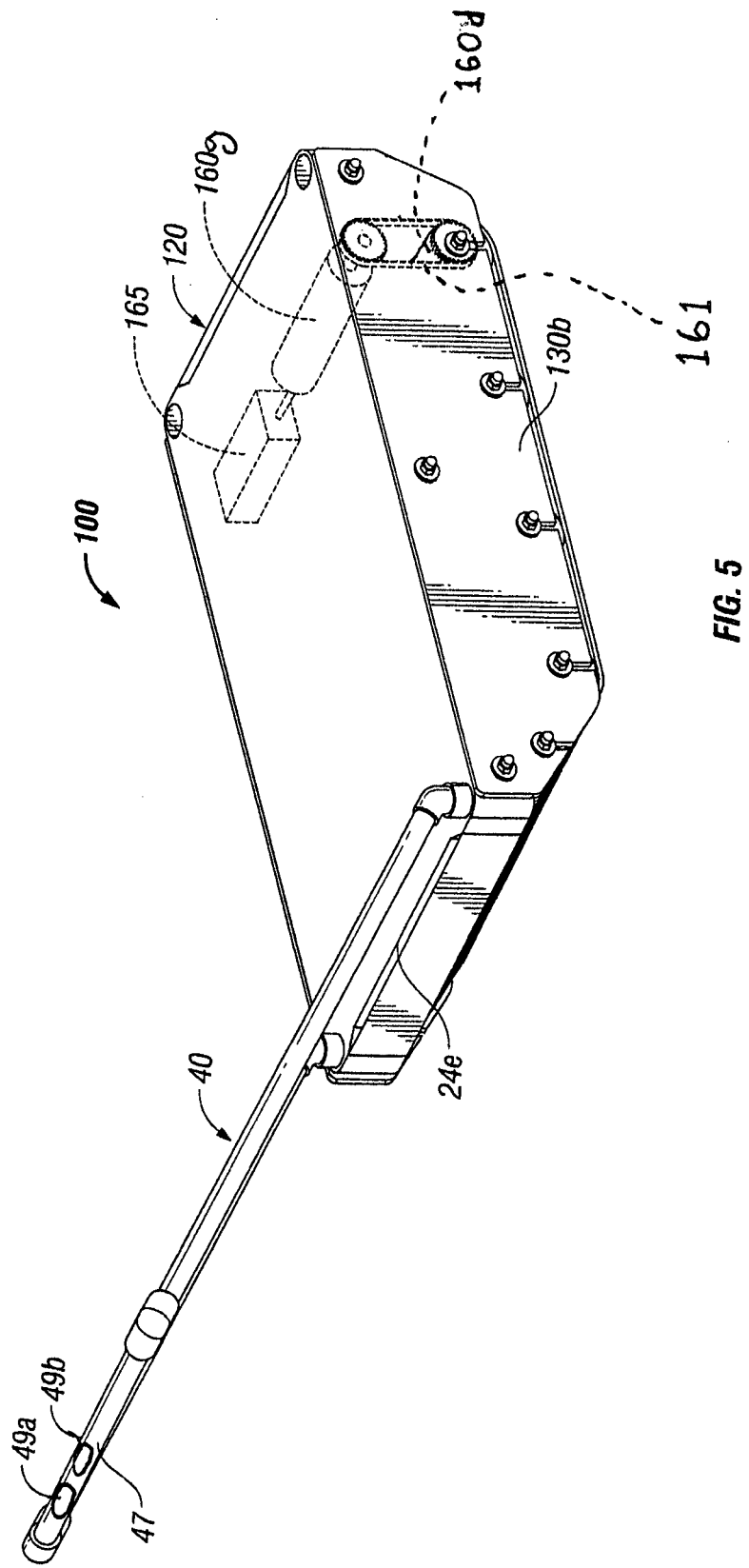
FIG. 5 is a perspective view of a mobilized beach trolley constructed in accordance with another embodiment of the present disclosure having a motor disposed therein.

FIGS. 5-11 show various envisioned alternate embodiments of one or more features of the trolley 10 for use depending upon a particular purpose. For example, FIG. 5 shows a trolley 100 which includes a housing 120 having a motorized roller bearing 160g disposed therein operatively engaged to a motor 165. Motor 165 may directly engage roller bearing 160g or may indirectly engage a roller bearing 160d via a chain drive 161 or other suitable drive arrangement.

Various controls may be incorporated in the handle (or on the trolley 10) to operate the roller bearing 160 in a forward or reverse direction. A speed control, e.g., variable speed control (not shown) may also be utilized if desired to regulate the speed of the trolley across a given terrain. In addition, the motor may simply be utilized as a power assist mechanism to facilitate transport. For example, the speed control may be incorporated into the handle 40 and configured to drive the trolley 10 in proportion to the force applied to the handle.

In one embodiment, the motor includes a battery (not shown) which supplies power to the motor 165 and the operating components thereof. The battery may be rechargeable and includes an electrical interface for recharging the same. The battery may also be solar powered, solar re-chargeable and/or partially solar powered. It is envisioned that the battery may also provide power to an electrical outlet (not shown) which supplies auxiliary power to various other types of electronic equipment, e.g., radios, compact disc players, grills, lights, blenders, fans, etc. Alternatively, electronics may be incorporated into the trolley 10 and connected to the battery. For example, an electronic docking station, amplifier and speakers may be incorporated into the sidewall 130a of the trolley 10 or an electronic control station (not shown) may be mounted on the handle 47.

Figure 6:
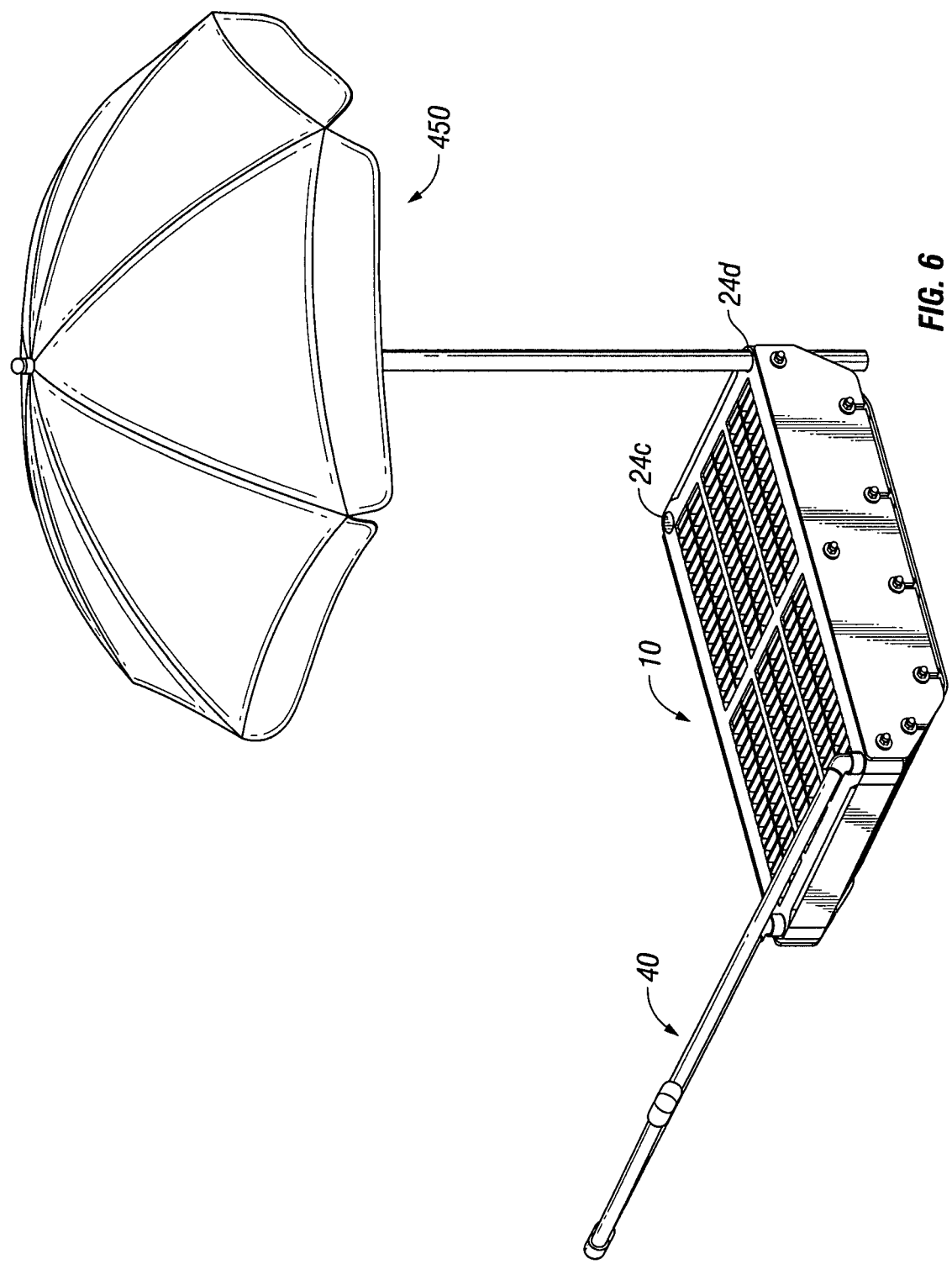
FIG. 6 is a perspective view of the mobilized beach trolley of FIG. 1 showing an umbrella mounted in a top surface thereof FIG. 7 are perspective views of the mobilized beach trolley of FIG. 1 showing variations of a handle assembly for facilitating transport.

FIG. 6 shows an alternate embodiment of the trolley 10 which includes a support sleeve 24d which is configured to releasably secure an umbrella 450 therein. An interface (not shown) may be utilized to facilitate engagement of the umbrella within the support sleeve 24d. Umbrella may be positioned in any of the support sleeves 24a-24d depending upon desired positioning and sun location.

Figure 7:
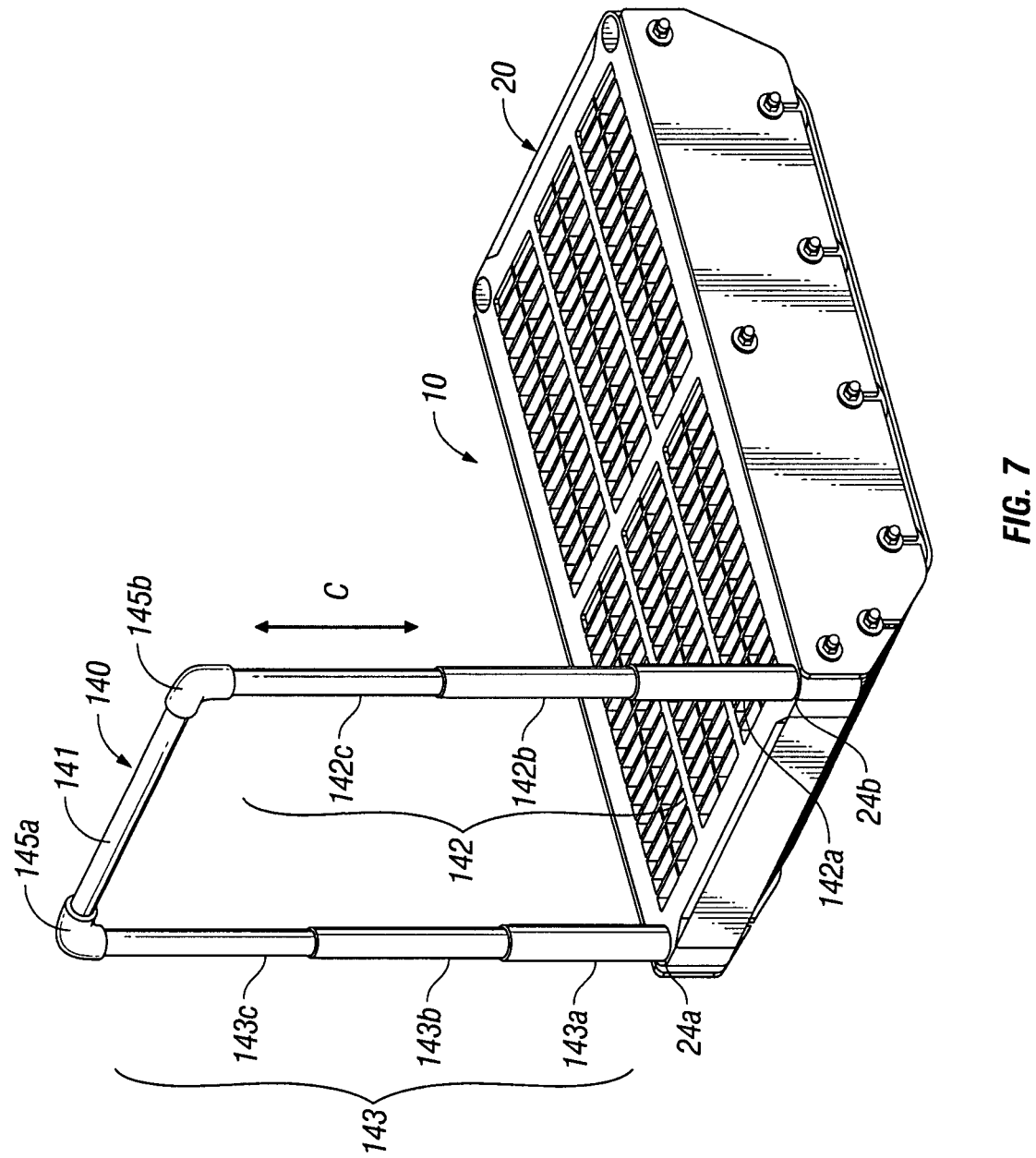

FIG. 7 shows another embodiment of the trolley 10 which includes a selectively extendible handle 140. More particularly, handle 140 includes a series of interleaved or telescopic sleeves 142a-142c and 143a-143c which are extendible from a fully retracted and recessed position inside housing 20 to a fully extended position to form handle legs 143 and 142 similar to legs 43 and 42 of FIG. 1. A user simply grasps handle bar 141 to extend or retract the handle 140 relative to the housing 20 in the direction of arrow "C". In this instance, couplings 145a and 145b may be integrally secured to handle 141 and sleeves 142c, 143c to reduce the chances of the sleeves 142c, 143c de-coupling from handle bar 141.

Figure 8:
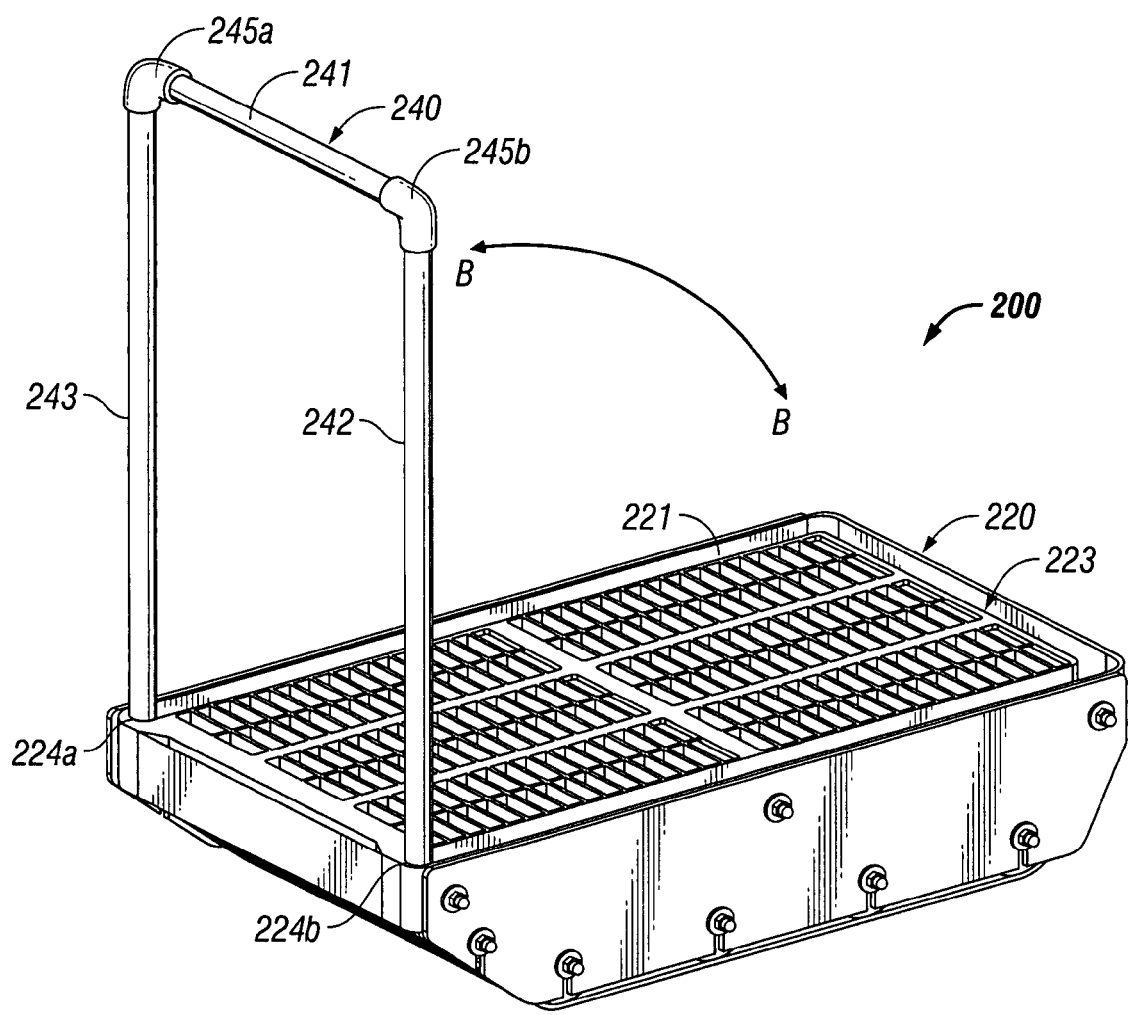

FIG. 8 shows another embodiment of a trolley 200 which includes a selectively recessable handle 240. More particularly, handle 240 includes a support legs 243 and 242 which are rotatable from a fully recessed position within a recess 223 defined in housing platform 221 to a fully extended and upright position for transporting items. A user simply grasps handle bar 241 to rotate the handle 240 relative to the housing 220 in the direction of arrow "B". Again, in this instance, couplings 245a and 245b may be integrally secured to handle bar 241 and legs 242, 243 to reduce the chances of the legs de-coupling from handle bar 241. Support sleeves 224a and 224b in this instance are dimensioned more like support cuffs (partially arcuate) to allow for the rotation of the handle 240 relative to housing 220. Support cuffs 224a and 224b may be dimensioned to include an angle (not shown) defined therewithin relative to housing 220 to allow the handle 240 to rotate beyond 90° to facilitate handling.

Figure 9:
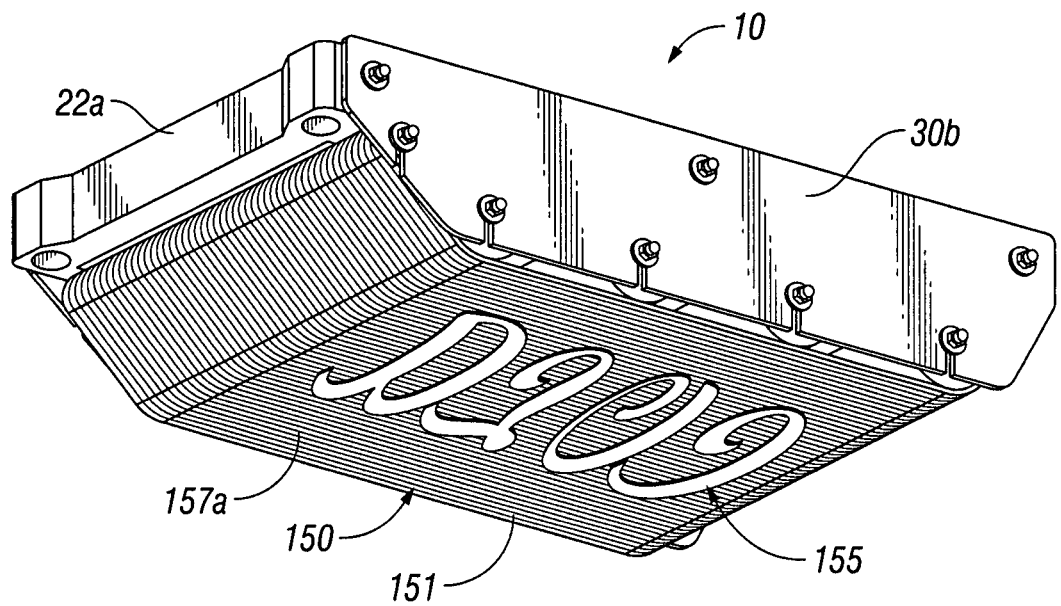
FIG. 9 is a bottom perspective view of the mobilized beach trolley of FIG. 1 showing a drive belt with a logo embossed thereon for imprinting the terrain during movement thereacross.

FIG. 9 includes another embodiment of the trolley 10 which has a uniquely formed belt assembly 150. More particularly, belt assembly 150 includes a similarly dimensioned belt 151 which is configured to rotate about the periphery of roller bearings 60a-60d and 64 as described above and also includes an embossed or raised element 155 defined on outer surface 157a. During use and as the belt 151 rotates around the bearings 60a-60d and 64, the belt 151 imprints the raised element 155 onto the terrain as the trolley 10 is transported. As can be appreciated, any type of logo or advertising may be used for this purpose. The imprinting would obviously work best on soft terrain surfaces such as sand or grass.

Figure 10:
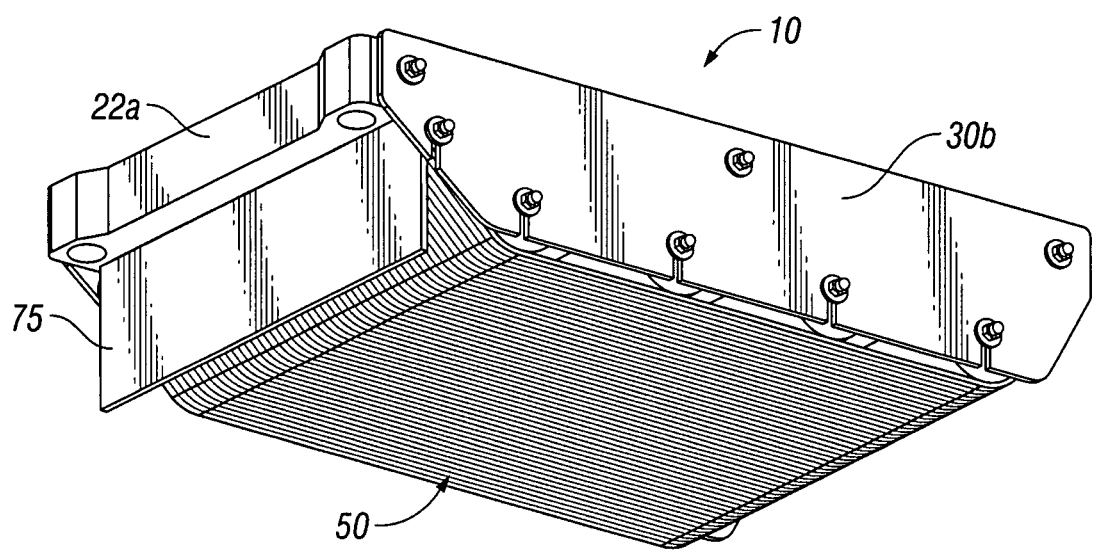
FIG. 10 is a bottom perspective view of the mobilized beach trolley of FIG. 1 showing a brush flap on a front edge thereof for smoothing the terrain as the trolley moves thereacross.

FIG. 10 shows yet another envisioned embodiment of the trolley 10 which has a front brush or flap 75 which mounts to the housing 20 proximate the front wall 22a. During use, the flap 75 lightly brushes away or smoothes sand or heavy grass to facilitate transport and movement of the trolley 10 across the terrain. Any type of flap or brush-like element 75 may be utilized depending upon a particular terrain or particular purpose.

Figure 11A:
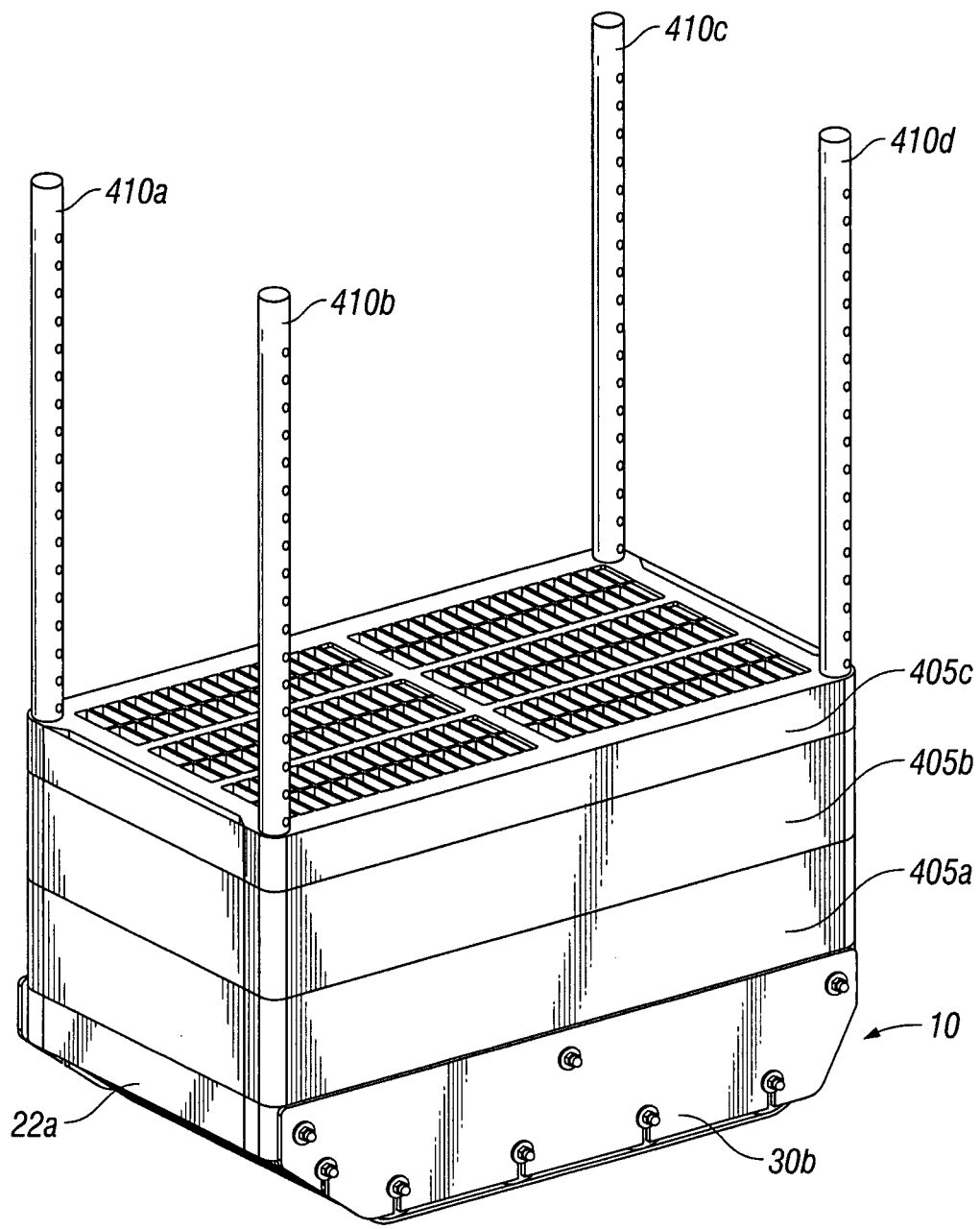
FIGS. 11A and 11B are perspective views of a mobilized beach trolley of FIG. 1 with a series of modular platforms.
Figure 11B:
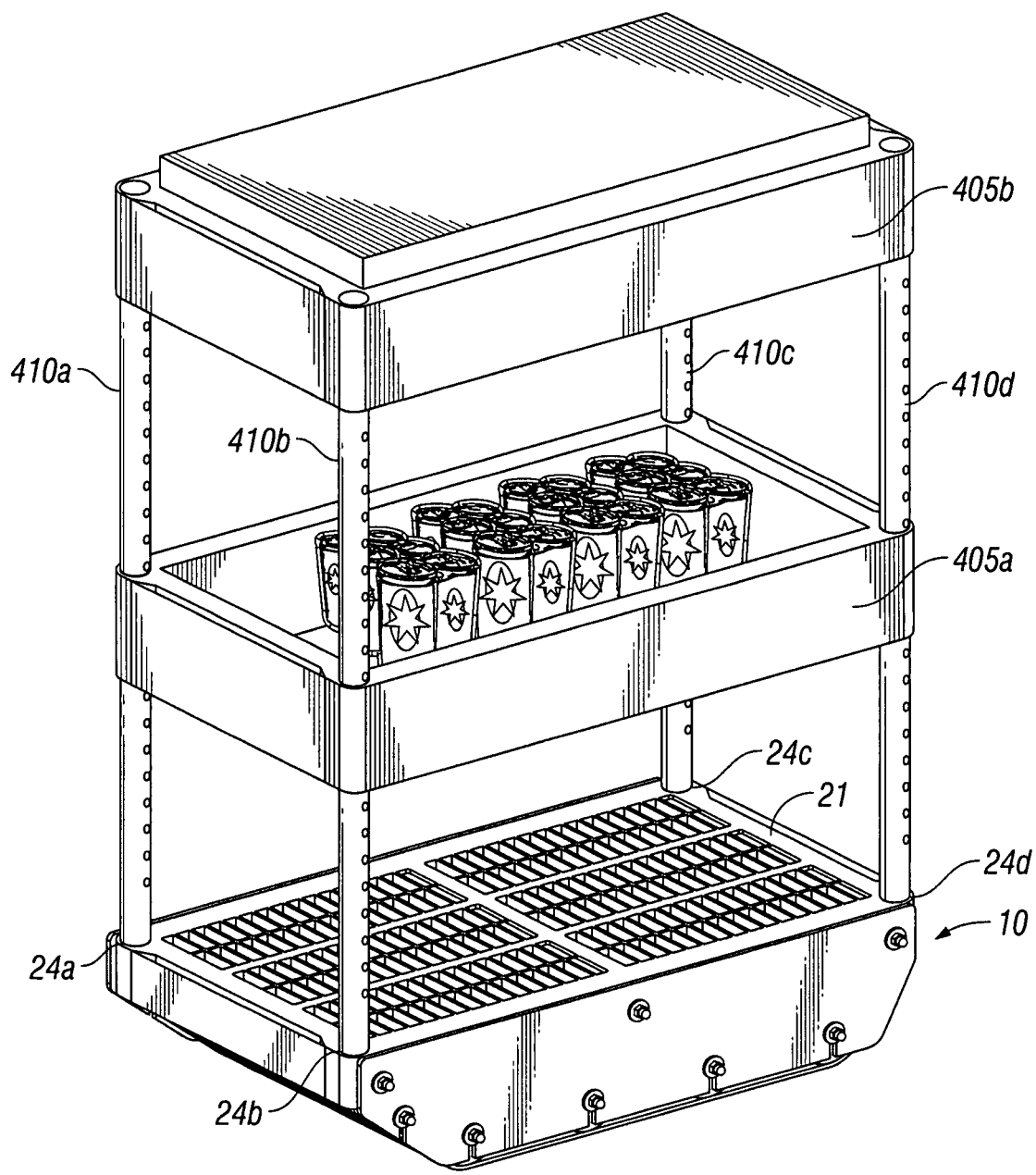
Figure 11C:
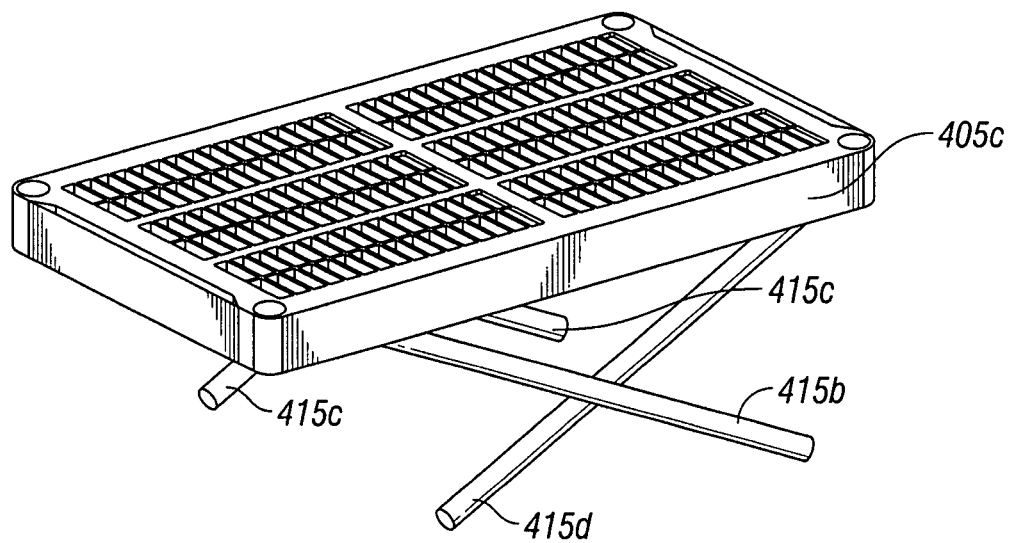
FIGS. 11C and 11D are perspective views of a component of a modular platform dimensioned to act as a portable table.
Figure 11D:
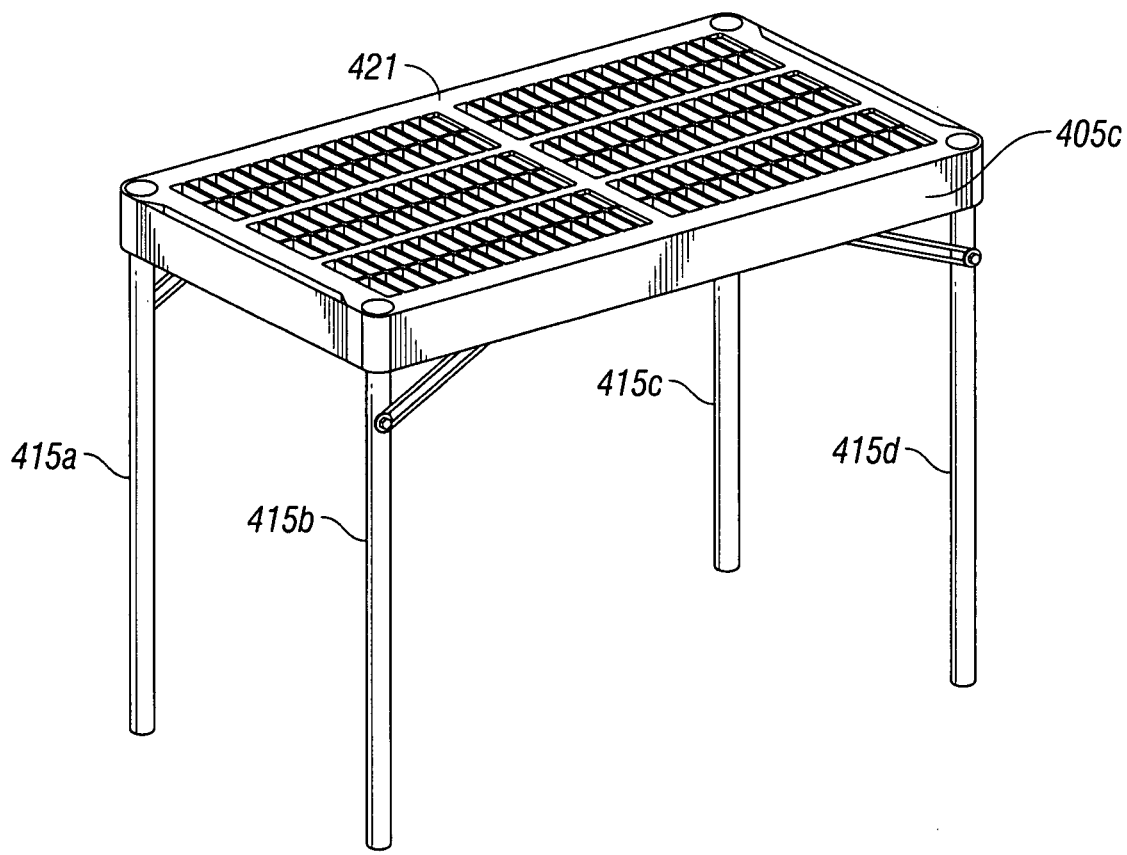

FIG. 11A-11D show yet another embodiment of the trolley 10 which includes a series of modular platforms 405a-405c which selectively stack atop platform 21 via inter-engagement with the support sleeves 24a-24d. More particularly, trolley 10 is configured in much the same fashion as described with respect to FIG. 1. The components 405a-405c are similar in dimension and size relative to the platform 21 but each may be configured to suit a particular purpose. For example, component 405a may be configured to act like a cooler and keep various items cold while at the beach or other remote area. Component 405b may be configured to act as a storage container for various items such as plates, napkins, dry goods, knives, forks, etc. As shown in FIG. 11B, the components 405a and 405b may be stacked and spaced atop support poles 410a-410d which engage support sleeves 24a-24d, respectively, defined in platform 21 of trolley 10. Component 405c may be dimensioned to act as a portable table and include foldaway legs 415a-415d which recess in the underside of component 405c for storage (See FIGS. 11B-11D). A user simply unfolds the legs 415a-415d to configure a table for supporting various beach items or having a meal.

Figure 12A:
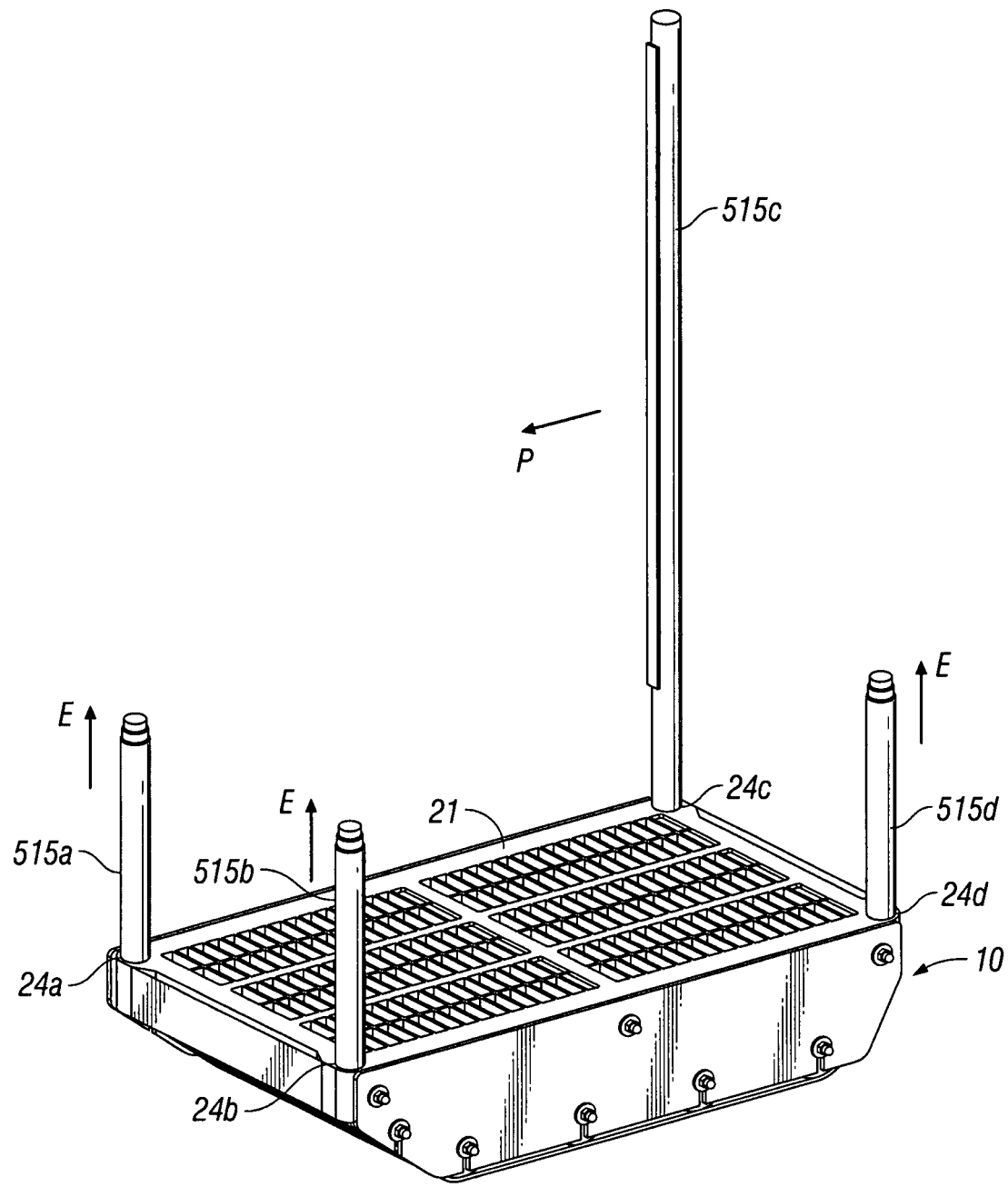
Figure 12B:
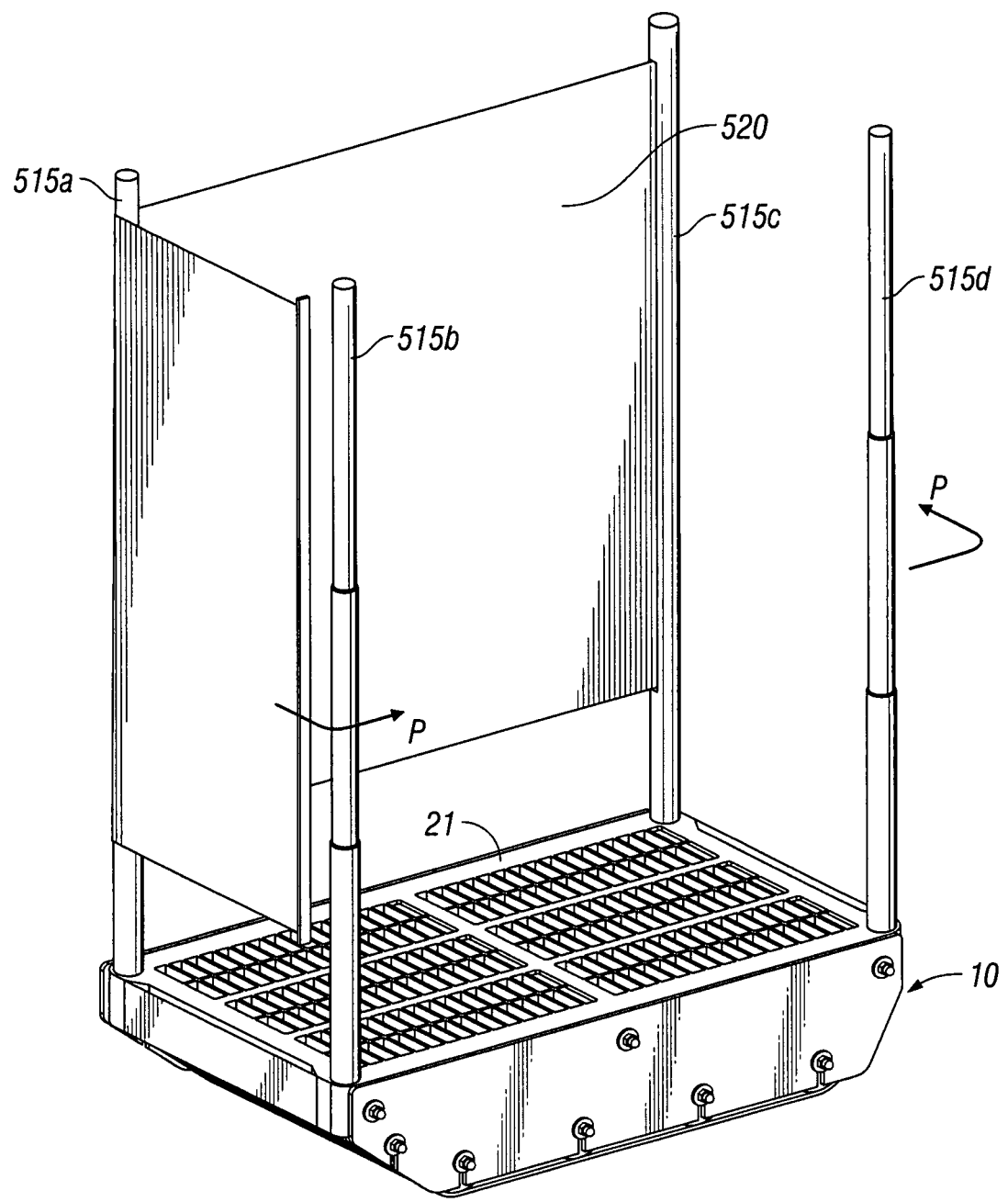
Figure 12C:
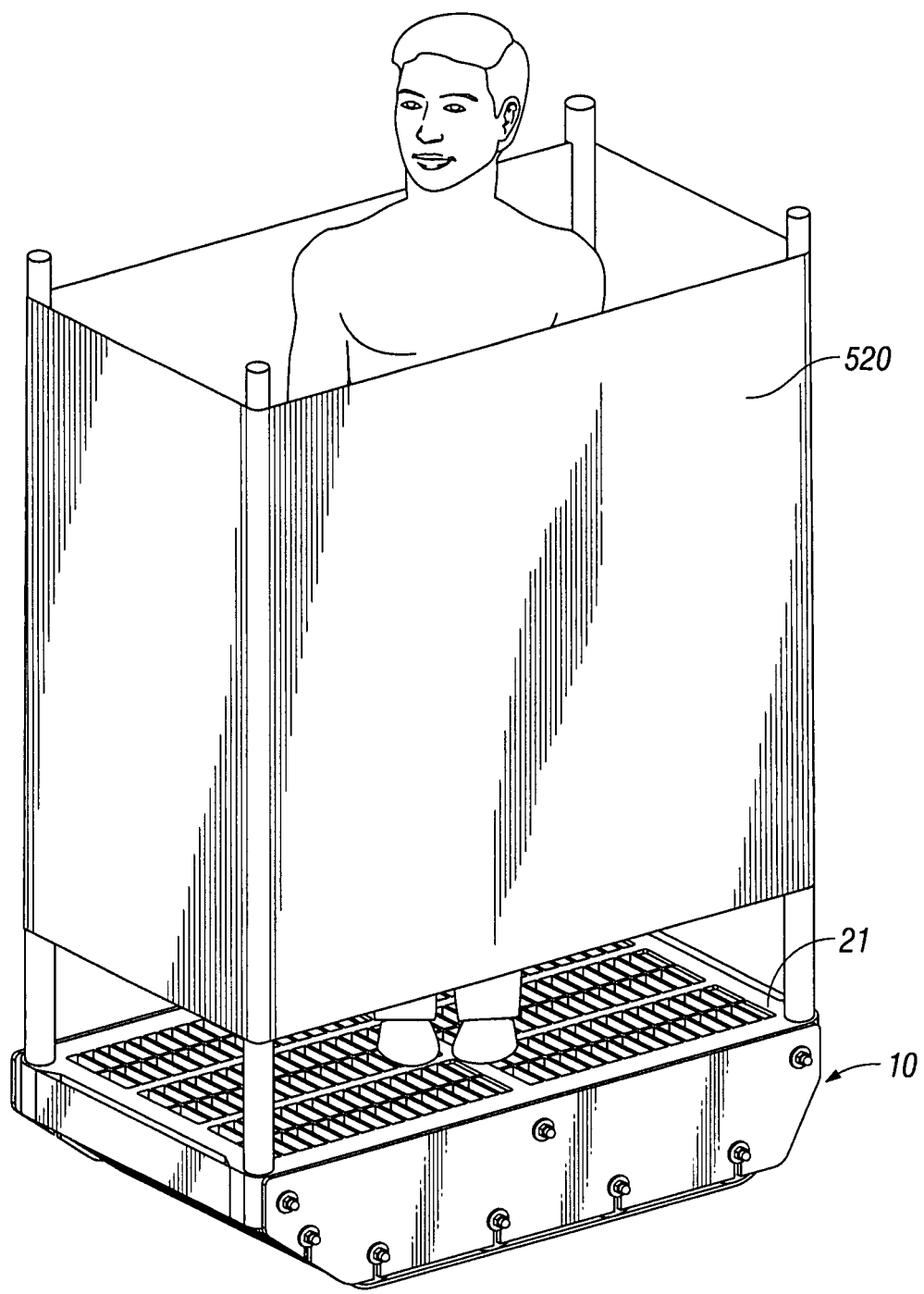

FIGS. 12A-12C show yet another embodiment of the trolley 10 which includes a series of telescopic sleeves which assemble to form a privacy screen 520. More particularly, trolley 10 is configured in much the same fashion as described with respect to FIG. 1. A series of telescopic sleeves 515a, 515b and 515d are configured to inter-engage corresponding support sleeves 24a, 24b and 24d. A retractable shade stanchion 515c is configured to engage the remaining support sleeve 24c. A user simply telescopically extends the sleeves 515a, 515b and 515d to an upright configuration relative to platform 21 in the direct of arrow "E" stands on the platform 21 and pulls a retractable privacy screen 520 around the telescopic sleeves 515a, 515b and 515d in the direction of arrow "P" to form an enclosure with privacy shade 520 (See FIG. 12C).

Figure 13A:
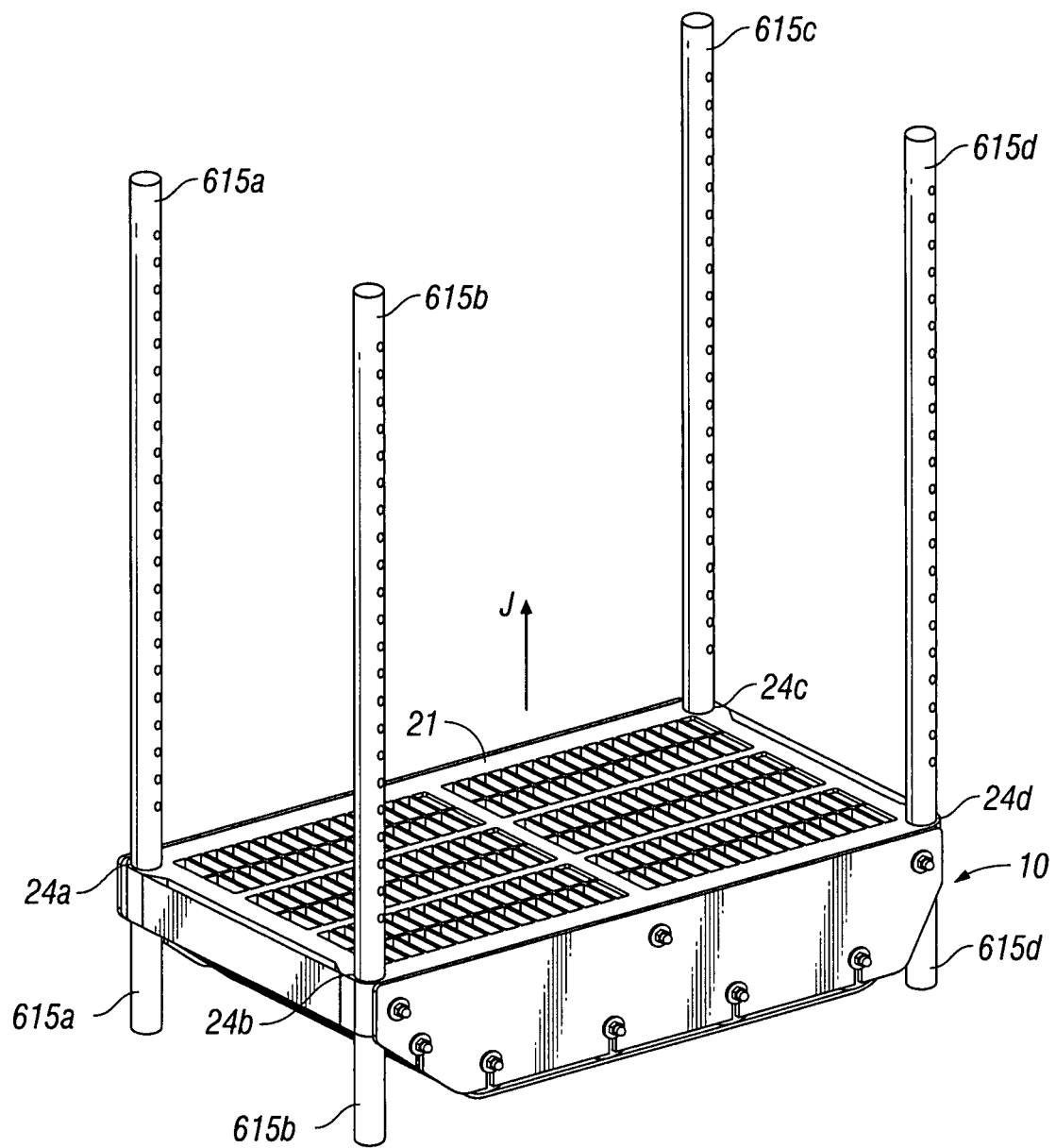
FIGS. 13A-13C are a series of perspective views of a mobilized beach trolley of FIG. 1 with support stanchions that assemble with the platform to form a privacy screen.
Figure 13B:
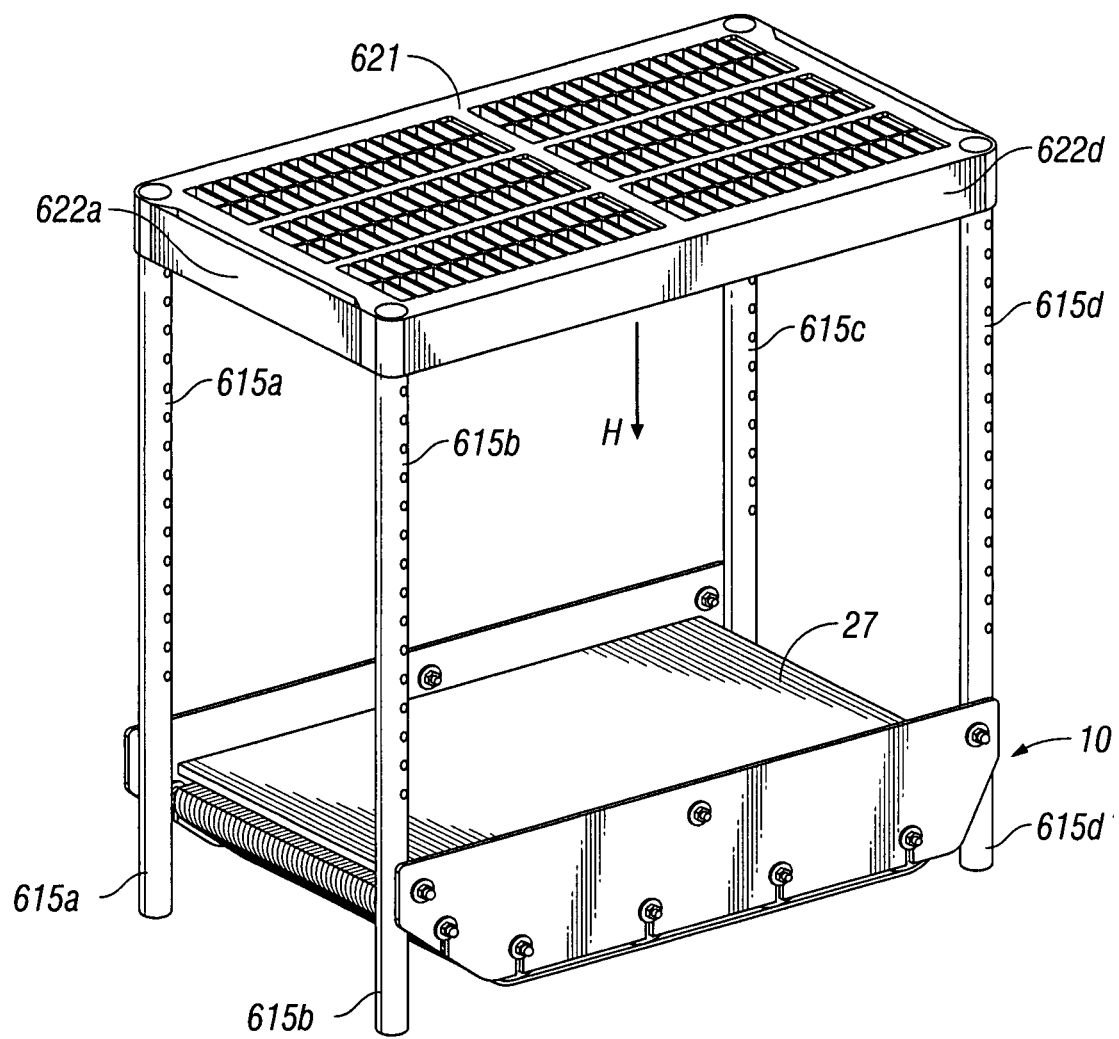
Figure 13C:
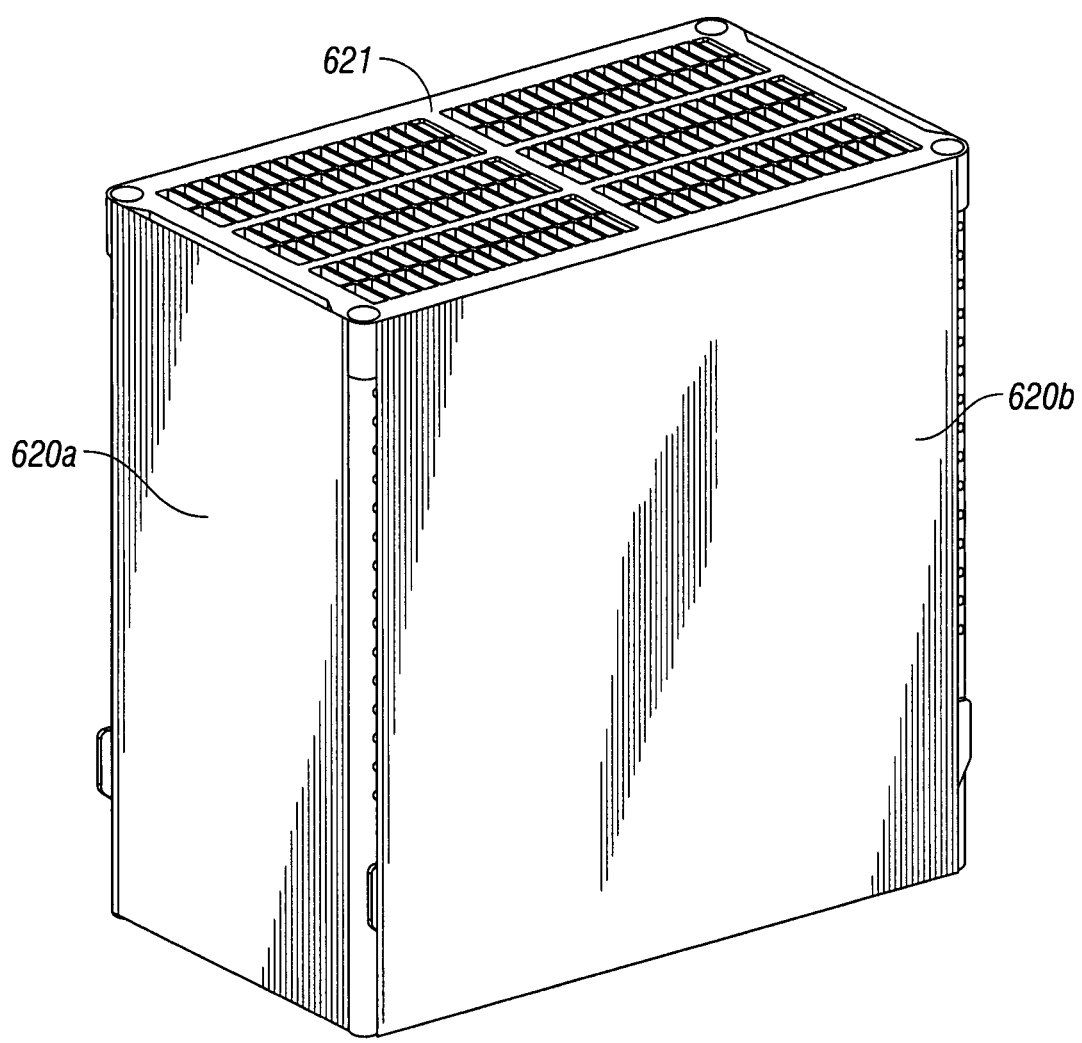

FIG. 13A-13C show yet another embodiment of the trolley 10 which includes a series of support stanchions 615a-615d which assemble with the platform 621 to form a privacy screen 620. More particularly, trolley 10 is configured in much the same fashion as described with respect to FIG. 1 with the exception that the support stanchions 615a-615d are configured to depend from platform 621 to selectively implant in the sand, grass or any other given terrain. In use, the user selectively engages the stanchions 615a-615d through the corresponding support sleeves 24a-24d and implants the corresponding ends 615a'-615d' of the stanchions into the terrain. The user then raises the platform 621 atop the stanchions 615a-615d in the direction of arrow "J". The user may selectively set the height of the platform 621 relative to the terrain by virtue of a series of discreet holes defined in each stanchion which allow height adjustments as is commonly known in the art. Once the height is set, the user simply pulls down a series of privacy shades 620a and 620b hidden within the sides 622a and 622b of the platform 621. As can be additional privacy shades (not shown) may be pulled down to form a complete enclosure.

Figure 14A:
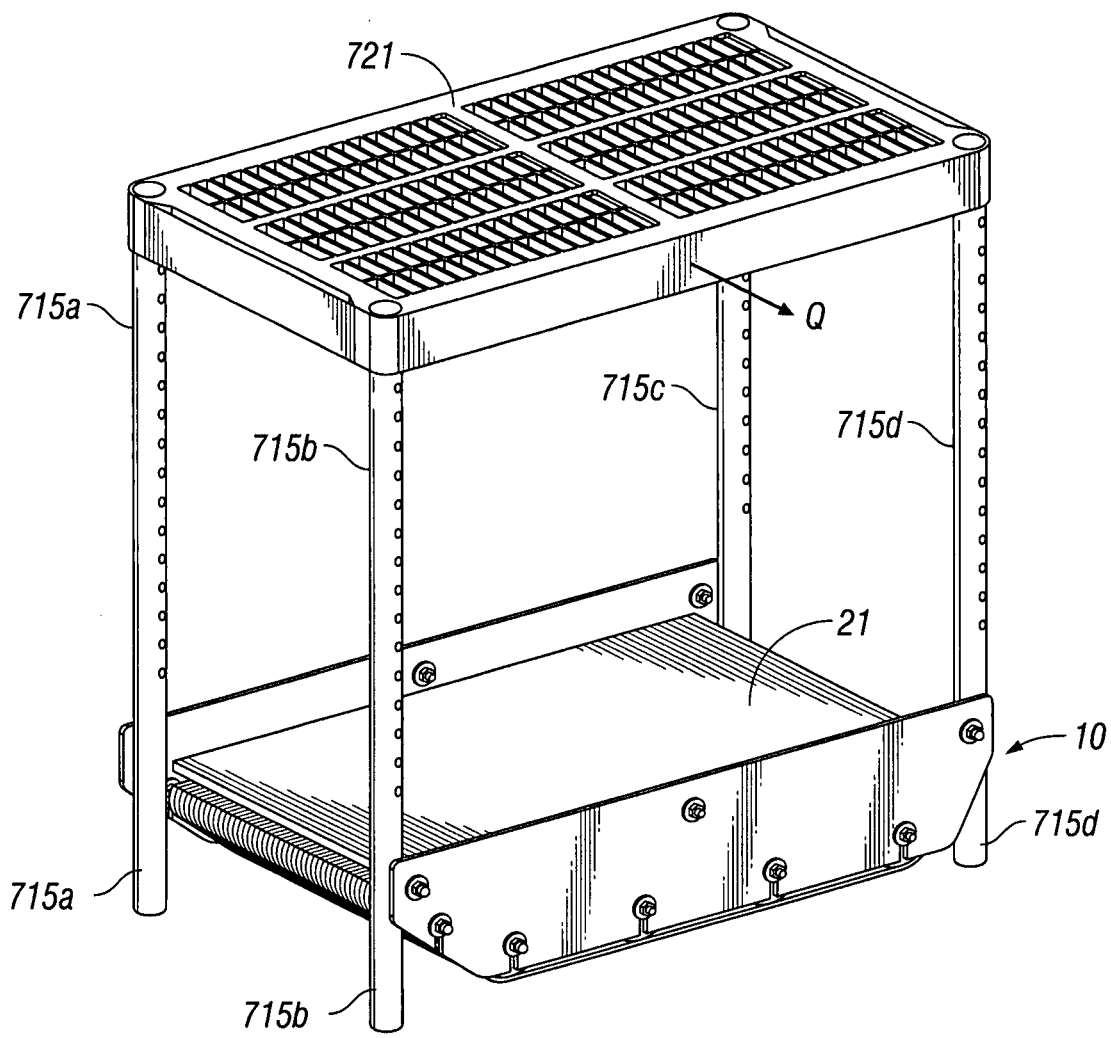
Figure 14B:
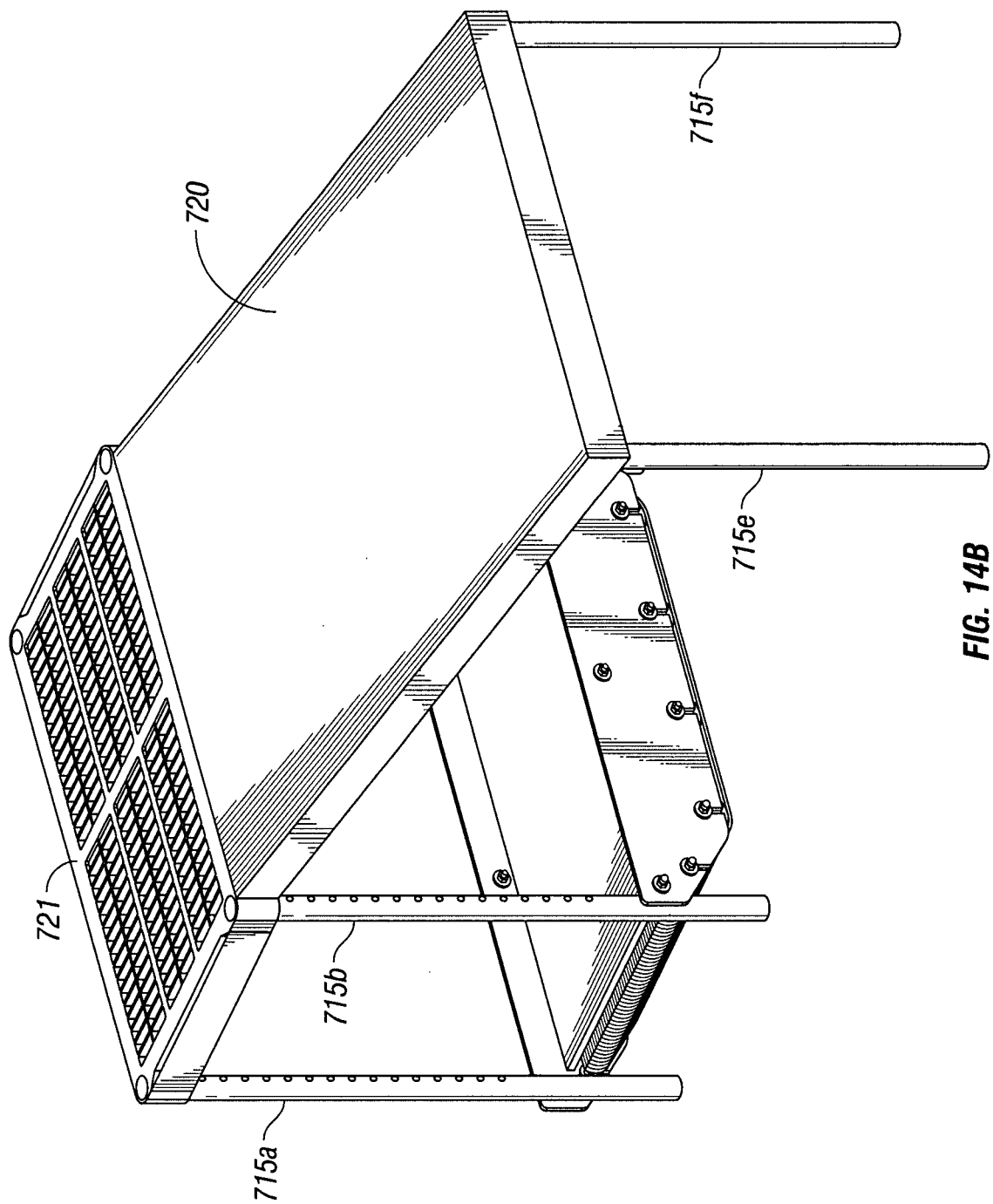

FIGS. 14A and 14B show yet another embodiment of the trolley 10 which includes a series of support stanchions 715a-715d which assemble in a similar fashion as described above with respect to FIGS. 13A-13C. Again, trolley 10 is configured in much the same fashion as described with respect to FIG. 1 with the exception that the support stanchions 715a-715d are configured to depend from the platform 721 to selectively implant in the sand, grass or any other given terrain (See FIG. 14A). A pair of additional stanchions 715e and 715f are displaced a distance from the platform 721 and implanted into the sand, grass or given terrain. A privacy shade 720 is extended to engage stanchions 715a and 715f defining a shaded area thereunder.

From the foregoing and with reference to the various figure drawings, those skilled in the art will appreciate that certain modifications can also be made to the present disclosure without departing from the scope of the same. For example, top platform 21 may be dimensioned to selectively engage and disengage housing 20 to suit a particular purpose. For example, top platform 21 may be dimensioned to act as a removable tray and/or beverage holder with various pockets and/or sleeves contained therein for holding articles. Alternatively, top platform 21 may be engaged with a temperature regulator (not shown) which can act as a cooling plate or hot plate for cooling or heating various food items. As can be appreciated, in this circumstance top platform 21 would serve a dual purpose: 1) to thermally regulate the items contained within the housing 20 during storage and transport; and 2) to serve as a hot plate or cooling plate when cover is disposed in the open position.

Top platform 21 may be adapted to transport people, i.e., infants, children, physically challenged or mobility challenged individuals. In one embodiment top platform 21 may be configured to secure an infant carrier or car seat. For example, an infant carrier may engage a locking mechanism (not shown) incorporated into the platform. The platform may include a retractable seat belt to secure a child seat or top platform 21 may include a seat and straps similar to those on a child stroller. Alternatively, top platform 21 may include a wheelchair-type seat and may include safety straps to secure the individual.

The trolley 10 may also include a series of compartments defined therein which are configured to support one or more of the above-described elements such as the umbrella 450, handle components 140, 240, privacy shades 350, additional poles 550, fishing poles, etc. It is also contemplated that the container 10 may be manufactured from fire resistant materials and/or include manufacturing processes which incorporate or include the provision for adding other desirable qualities such protective coatings.

Moreover, the belt 51 may be perforated to allow contaminants to pass therethrough which will facilitate cleaning and maintenance of the trolley 10. The roller bearings 60a-60d and 64 may also be configured to include a tapered outer surface to facilitate rotation of belt 51 therearound.

While several embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A selectively configurable trolley for transporting articles across a given terrain, comprising:
   a housing including a top platform and sides that at least partially define an enclosure for mounting internal operating components therein;
   at least one roller bearing disposed proximate a proximal portion of the housing and at least one additional roller bearing disposed proximate a distal portion of the housing;
   a belt supported by the at least one roller bearing and the at least one additional roller bearing, the belt including an element defined on an outer surface thereof, the element configured to imprint the element onto the terrain as the trolley is transported; and
   a handle attached to the housing for at least one of pushing and pulling the trolley,
   wherein the element is a logo or advertizing.

2. A selectively configurable trolley according to claim 1 wherein the trolley includes a plurality of roller bearings which support the belt, the most proximal roller bearing being raised relative to the other roller bearings to facilitate rotation of the belt.

3. A selectively configurable trolley according to claim 1 wherein the element is one of an embossed element and a raised element.

4. A selectively configurable trolley according to claim 1 wherein the element continually imprints the terrain as the trolley is transported.

5. A selectively configurable trolley according to claim 1 wherein the belt includes a material made from a first coefficient of friction disposed on a first side thereof and a material made from a second coefficient of friction disposed on a second side thereof.

6. A selectively configurable trolley for transporting articles across a given terrain, comprising:
- a housing including a top platform and sides that at least partially define an enclosure for mounting internal operating components therein, the top platform including a series of support sleeves defined therein;
- at least one roller bearing disposed proximate a proximal portion of the housing and at least one additional roller bearing disposed proximate a distal portion of the housing;
- a belt supported by the at least one roller bearing and the at least one additional roller bearing, the belt including an element defined on an outer surface thereof, the belt configured to imprint the element onto the terrain as the trolley is transported;
- a handle attached to the housing for at least one of pushing and pulling the trolley; at least one support poles engageable within a support sleeve such that the support pole extends upwardly therefrom; and
- a retractable shade engageable within the support sleeve, said retractable shade including a privacy screen which is selectively extendible to engage the support pole and form a partial enclosure atop the platform.

7. A selectively configurable trolley according to claim 6 wherein three support poles are positioned around the platform and the privacy screen wraps around the support poles to engage back upon the retractable shade to form a complete enclosure around the platform.

8. A selectively configurable trolley according to claim 7 wherein the support poles are telescopically extendible to an upright orientation.

9. A selectively configurable trolley for transporting articles across a given terrain, comprising:
- a housing including a top platform and sides that at least partially define an enclosure for mounting internal operating components therein, the top platform including a series of support sleeves defined therein;
- at least one roller bearing disposed proximate a proximal portion of the housing and at least one additional roller bearing disposed proximate a distal portion of the housing;
- a belt supported by the at least one roller bearing and the at least one additional roller bearing, the belt including an element defined on an outer surface thereof, the element configured to imprint the element onto the terrain as the trolley is transported;
- a handle attached to the housing for at least one of pushing and pulling the trolley; and
- at least one support poles engageable within a support sleeve such that the support pole extends upwardly therefrom; and at least one modular platform including apertures defined therein which align with the support sleeves of the top platform to receive the at least one support poles therethrough to secure the modular platform atop the top platform.

10. A selectively configurable trolley according to claim 9 wherein the modular platform is a cooler.

11. A selectively configurable trolley for transporting articles across a given terrain, comprising:
- a housing including a top platform and sides that at least partially define an enclosure for mounting internal operating components therein;
- at least one roller bearing disposed proximate a proximal portion of the housing and at least one additional roller bearing disposed proximate a distal portion of the housing;
- a belt supported by the at least one roller bearing and the at least one additional roller bearing, the belt including an element defined on an outer surface thereof, the element configured to imprint the element onto the terrain as the trolley is transported; and
- a handle attached to the housing for at least one of pushing and pulling the trolley,
- wherein the top platform is grated and includes a series of support sleeves defined therein, at least one of the support sleeves being configured to engage an angled coupling which operatively engages the handle.

12. A selectively configurable trolley according to claim 11 wherein the at least one additional roller bearing being raised relative to the at least one roller bearing to facilitate rotation of the belt.

13. A selectively configurable trolley according to claim 11 wherein the element is a logo or advertizing.

14. A selectively configurable trolley according to claim 11 wherein the element is one of an embossed element and a raised element.

15. A selectively configurable trolley according to claim 11 wherein the element continually imprints the terrain as the trolley is transported.

16. A selectively configurable trolley according to claim 11 wherein the belt includes a material made from a first coefficient of friction disposed on a first side thereof and a material made from a second coefficient of friction disposed on a second side thereof.

* * * * *